(12) United States Patent
Kwon et al.

(10) Patent No.: US 8,993,144 B2
(45) Date of Patent: Mar. 31, 2015

(54) THREE DIMENSIONAL SHAPED BATTERY

(71) Applicant: Samsung Electronics Co., Ltd., Suwon-si (KR)

(72) Inventors: Moon-seok Kwon, Hwaseong-si (KR); Seok-gwang Doo, Seoul (KR); Hyuk Chang, Seongnam-si (KR); Jae-man Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 53 days.

(21) Appl. No.: 13/711,972

(22) Filed: Dec. 12, 2012

(65) Prior Publication Data

US 2013/0280567 A1 Oct. 24, 2013

(30) Foreign Application Priority Data

Apr. 23, 2012 (KR) .................. 10-2012-0042182

(51) Int. Cl.
| | | |
|---|---|---|
| *H01M 4/00* | (2006.01) |
| *H01M 10/0583* | (2010.01) |
| *H01M 10/0587* | (2010.01) |
| *H01M 10/04* | (2006.01) |
| *H01M 10/052* | (2010.01) |
| *H01M 6/40* | (2006.01) |

(52) U.S. Cl.
CPC ...... *H01M 10/0583* (2013.01); *H01M 10/0587* (2013.01); *H01M 10/0431* (2013.01); *H01M 10/0436* (2013.01); *H01M 10/052* (2013.01); *H01M 6/40* (2013.01)

USPC .............. 429/94; 429/149; 429/153; 429/164

(58) Field of Classification Search
CPC .............. Y02E 60/12; H01M 10/0525; H01M 10/0431; H01M 10/0585; H01M 10/052; H01M 2/0207; H01M 10/0583; H01M 10/0587; H01M 10/0436; H01M 6/40
USPC ..................... 429/94, 149, 153, 164
See application file for complete search history.

(56) References Cited

U.S. PATENT DOCUMENTS

| 8,592,065 | B2 | 11/2013 | Bhardwaj et al. | |
|---|---|---|---|---|
| 2008/0182157 | A1* | 7/2008 | Visco et al. | 429/50 |
| 2010/0112454 | A1* | 5/2010 | Visco et al. | 429/246 |
| 2011/0183183 | A1* | 7/2011 | Grady et al. | 429/152 |
| 2011/0304984 | A1* | 12/2011 | McClure et al. | 361/679.56 |
| 2012/0015236 | A1* | 1/2012 | Spare | 429/162 |

FOREIGN PATENT DOCUMENTS

| KR | 20000005813 Y1 | 4/2000 |
|---|---|---|
| KR | 1020030066960 A | 8/2003 |
| KR | 1020040016814 A | 2/2004 |

* cited by examiner

*Primary Examiner* — Stewart Fraser
(74) *Attorney, Agent, or Firm* — Cantor Colburn LLP

(57) ABSTRACT

A three-dimensional shaped battery includes a cell structure including a first electrode layer, a second electrode layer, and a separation layer disposed between the first electrode layer and the second electrode layer, where the cell structure may include a plurality of pattern units having different sizes from each other and a connecting portion which connects the pattern units to each other.

20 Claims, 8 Drawing Sheets

THREE DIMENSIONAL SHAPED BATTERY

CROSS-REFERENCE TO RELATED APPLICATIONS

This application claims priority to Korean Patent Application No. 10-2012-0042182, filed on Apr. 23, 2012, and all the benefits accruing therefrom under 35 U.S.C. §119, the content of which in its entirety is herein incorporated by reference.

BACKGROUND

1. Field

The disclosure relates to secondary batteries, and more particularly, to three-dimensional shaped batteries.

2. Description of the Related Art

As electronic technologies have developed, markets of portable electronic devices such as smart phones, smart pads, electronic books, watch-type telephones, and movable medical devices attached to a human body, as well as mobile phones, game devices, portable multimedia players ("PMP"s), and MPEG Audio Layer-3 ("MP3") players are substantially increasing. As the markets of the portable electronic devices develop, demands for batteries that are suitable for operating the mobile electronic devices are increasing.

In particular, mobile electronic devices having various shapes have been developed for convenience of usage, and are designed to arrange components in a narrow space as efficiently as possible to reduce a volume of the device. However, a battery mounting space in the portable electronic devices may be considered when designing the portable electronic devices. A battery is generally formed as a rectangular parallelepiped shape, and a space corresponding to the shape of the battery may be provided in the electronic device for mounting the battery in the portable electronic device.

Therefore, demands for batteries having a shape that may be flexibly mounted in a limited space of an electronic device according to a design of the portable electronic devices having various shapes are gradually increasing.

SUMMARY

Provided are three-dimensional shaped batteries that may be effectively applied to an electronic device according to an internal shape of the electronic device.

Provided are methods of manufacturing a three-dimensional battery that may be effectively applied to an electronic device according to an internal shape of the electronic device.

Additional aspects will be set forth in part in the description which follows and, in part, will be apparent from the description, or may be learned by practice of the embodiments as described herein.

According to an embodiment of the invention, a three-dimensional shaped battery includes: a cell structure including a first electrode layer, a second electrode layer, and a separation layer disposed between the first electrode layer and the second electrode layer, where the cell structure may include a plurality of pattern units having different sizes from each other and a connecting portion which connects the pattern units to each other.

In an embodiment, the connecting portions may be bent or folded such that the pattern units are stacked to face each other.

In an embodiment, areas of the pattern units may be gradually changed in a direction in which the pattern units are stacked.

In an embodiment, an intermediate portion in the stacked pattern units may have an area greater than areas of other portions in the stacked pattern units.

In an embodiment, an intermediate portion in the stacked pattern units may have an area less than areas of other portions in the stacked pattern units.

In an embodiment, a hole may be formed in the pattern units.

In an embodiment, a plurality of holes may be formed in the pattern units, respectively, at a portion corresponding to each other in the stacked pattern units.

In an embodiment, an inclination surface may be defined by end portions of the pattern units in the stacked pattern units.

In an embodiment, the cell structure may include a plurality of connecting portions having different sizes from each other.

In an embodiment, the cell structure may have a jelly roll type structure or a folding type structure.

In an embodiment, the cell structure may further include an active material layer which does not overlap the connecting portion.

In an embodiment, the three-dimensional shaped battery may include an electrode current collector extending from the first electrode layer or the second electrode layer, and a lead tap electrically connected to the electrode current collector.

In an embodiment, the electrode current collector may extend from the first electrode layer, the electrode current collector may extend from the second electrode layer, and the electrode current collector of the first electrode layer and the electrode current collector of the second current collector may extend in different directions from each other.

In an embodiment, the lead tap may be electrically connected to a region of the first electrode layer or the second electrode layer, which does not overlap the active material layer.

In an embodiment, the three-dimensional shaped battery may further include a pouch for packing the pattern units.

In an embodiment, the pattern units may include a first pattern unit through an m-th pattern unit, and an (m+1)-th pattern unit through an n-th pattern unit (m and n are integers), and when areas of the pattern units are respectively denoted as $A_1$ through $A_m$, and $A_{m+1}$ through $A_n$, where when m is an integer less than n/2 and closest to n/2 and the pattern unit having the largest area is disposed between the first pattern unit through the m-th pattern unit, $A_1$ through $A_m$ and $A_{m+1}$ through $A_n$ may satisfy the following inequation:

$$\frac{\sum_{i=1}^{m}\left(A_i - \frac{\sum_{k=1}^{m} A_k}{m}\right)^2}{m} > \frac{\sum_{j=m+1}^{n}\left(A_j - \frac{\sum_{l=m+1}^{n} A_l}{n-m}\right)^2}{n-m}.$$

In an embodiment, the connecting portions may include a first connecting portion through an h-th connecting portion, where h is a natural number, when widths of the connecting portions are respectively denoted as W1 through Wh, and the first connecting portion is connected to the first pattern unit, and when h is greater than 7 (h>7), W1 through Wh may satisfy the following inequation:

$$W_i + W_{i+1} + W_{i+2} + W_{i+3} > W_{i+4} + W_{i+5} + W_{i+6} + W_{i+7},$$

where i is an integer equal to or greater than 1 and equal to or less than h−7.

In an embodiment, the pattern units may include a first pattern unit through an m-th pattern unit, and an (m+1)-th pattern unit through an n-th pattern unit, where m and n are natural numbers, and when areas of the pattern units are respectively denoted as $A_1$ through $A_m$, and $A_{m+1}$ through $A_n$, and when m is an integer that is less than n/2 and closest to n/2 and the pattern unit having the largest area is disposed between the first pattern unit through the m-th pattern unit, $A_1$ through $A_m$ and $A_{m+1}$ through $A_n$ satisfy the following inequation:

$$\frac{\sum_{i=1}^{m} A_i}{m} > \frac{\sum_{j=m+1}^{n} A_j}{n-m}.$$

In an embodiment, the pattern units may include a first pattern unit through an m-th pattern unit, and an (m+1)-th pattern unit through an n-th pattern unit, where m and n are natural numbers, and when areas of the pattern units are respectively denoted as $A_1$ through $A_m$, and $A_{m+1}$ through $A_n$, and when m is an integer that is less than n/2 and closest to n/2 and the pattern unit having the largest area is disposed between the first pattern unit through the m-th pattern unit, $A_1$ through $A_m$ and $A_{m+1}$ through $A_n$ satisfy the following inequation:

$$\sum_{k=0}^{3} A_{i+k} > \sum_{j=4}^{7} A_{i+j},$$

where i is an integer equal to or greater than 1 and equal to or less than n−7.

According to another embodiment of the invention, a method of manufacturing a three-dimensional shaped battery includes providing a first electrode layer and a second electrode layer of a cell structure of the three-dimensional shaped battery by coating an electrode active material layer on an electrode current collector using a printing method, where the cell structure of the three-dimensional shaped battery includes the first electrode layer, the second electrode layer, and a separation layer disposed between the first electrode layer and the second electrode layer, where the cell structure further includes a plurality of pattern units having different sizes from each other, and a connecting portion disposed between the pattern units and which connects the pattern units to each other.

BRIEF DESCRIPTION OF THE DRAWINGS

These and/or other features will become apparent and more readily appreciated from the following description of the embodiments, taken in conjunction with the accompanying drawings of which.

DETAILED DESCRIPTION

Figure 1:
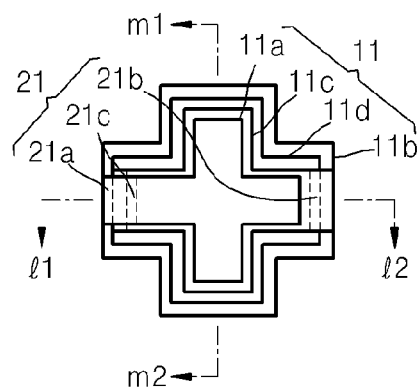
FIG. 1 is a plan view of an embodiment of a three-dimensional shaped battery according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Reference will now be made in detail to three-dimensional shaped batteries according to embodiments, examples of which are illustrated in the accompanying drawings, where like reference numerals refer to the like elements throughout. Thickness of layers or regions shown in the drawings may be exaggerated for clarity of the specification. Expressions such as "at least one of," when preceding a list of elements, modify the entire list of elements and do not modify the individual elements of the list.

Hereinafter, embodiments according to the invention will be described with reference to the accompanying drawings.

FIG. 1 is a plan view of an embodiment of a three-dimensional shaped battery according to the invention. An embodiment, as shown in FIG. 1, the three-dimensional shaped battery may has a stacked structure in which cell structures, each including a first electrode layer, a separation layer and a second electrode layer, are stacked in a multi-layered structure.

Referring to FIG. 1, a cell structure of the three-dimensional shaped battery includes a plurality of pattern units 11, and a plurality of connecting portions 21 disposed between the pattern units 11. In FIG. 1, the pattern units 11 include first through fourth pattern units 11a, 11b, 11c and 11d that have different sizes and are stacked; however, the number of the pattern units 11 is not limited thereto. The connecting portions 21 are disposed between the pattern units 11 and connected to the pattern units 11. In FIG. 1, the connecting portions 21 include first through third connecting portions 21a, 21b and 21c; however, the invention is not limited thereto, that is, the number of the connecting portions 21 between the pattern units 11 may be determined based on the number of the pattern units, e.g., the number of the connecting portions 21 increases when the number of the pattern units 11 increases. The number of the connecting portions 21 may be greater than or equal to two, and the connecting portions 21 may have different sizes from each other. The connecting portions 21 may be bent or folded to stack the pattern units 11 while facing each other. In such an embodiment, the cell structure may be a jelly roll structure or a folding structure. In one embodiment, for example, a planar element (FIG. 2A) may be repeatedly rolled or folded on itself (FIGS. 2B to 2D) to form the jelly roll structure.

FIGS. 2A through 2D are plan views showing an unfolded states and folded states of the cell structure in the three-dimensional shaped battery of FIG. 1.

Figure 2A:
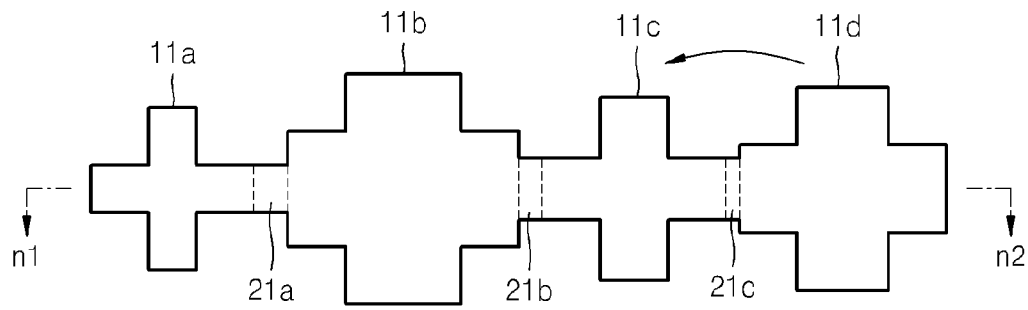
FIGS. 2A through 2D are diagrams showing an unfolded state and folded states of a cell structure in the three-dimensional shaped battery shown in FIG. 1.

Referring to FIG. 2A, the cell structure of the three-dimensional shaped battery includes the first pattern unit 11a, the second pattern unit 11b, the third pattern unit 11c and the fourth pattern unit 11d. The first connecting portion 21a is disposed between the first pattern unit 11a and the second pattern unit 11b, the second connecting portion 21b is disposed between the second pattern unit 11b and the third pattern unit 11c, and the third connecting portion 21c is disposed between the third pattern unit 11c and the fourth pattern unit 11d. In an embodiment of the three-dimensional battery structure shown in FIG. 1, the connecting portions between the pattern units may be bent or folded such that the pattern units are stacked facing each other.

Figure 2B:
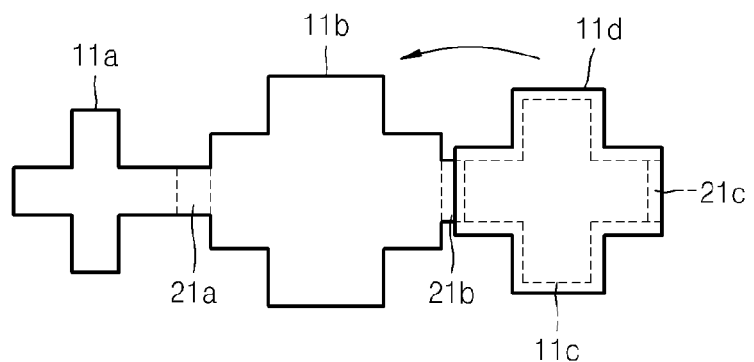
Figure 2C:
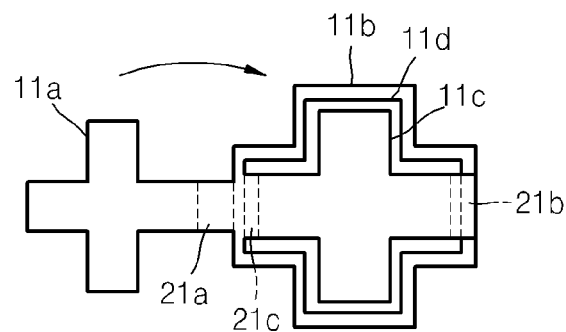
Figure 2D:
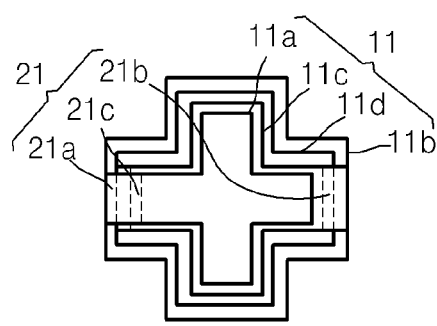

In one embodiment, for example, as shown in FIG. 2B, the third connecting portion 21c is bent or folded such that the fourth pattern unit 11d is disposed on the third pattern unit 11c. Then, as shown in FIG. 2C, the second connecting portion 21b is bent or folded such that the fourth pattern unit 11d and the third pattern unit 11c are disposed on the second pattern unit 11b. Then, the first connecting portion 21a is bent or folded on the third pattern unit 11c such that the three-dimensional shaped battery shown in FIG. 2D may be provided.

Sizes, shapes and the number of the pattern units 11 may be variously selected based on a shape and a size of a space to be occupied by the battery in a portable electronic device. The sizes of the pattern units 11 may be different from each other. In an embodiment, some of the pattern units may have the same size as each other, and at least two pattern units may have different sizes from each other. The shapes of the pattern units 11 may be substantially similar to each other; however, the invention is not limited thereto. In one embodiment, for example, as shown in FIG. 1, the pattern units 11 may have a planar cross-like shape; however, the invention is not limited thereto. In an embodiment, the pattern units may have a curved surface or a rough surface at a boundary portion thereof. In an alternative embodiment, holes may be formed in the pattern units 11.

Figure 3A:
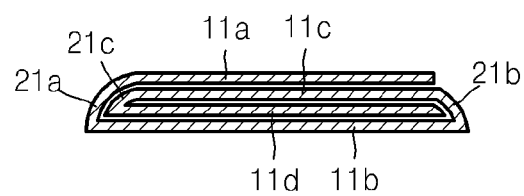
FIG. 3A is a cross-sectional view taken along line l1-l2 of the three-dimensional shaped battery of FIG. 1.

FIG. 3A is a cross-sectional view taken along line l1-l2 of the three-dimensional shaped battery of FIG. 1. Referring to FIG. 3A, the fourth pattern unit 11d, the third pattern unit 11c, and the first pattern unit 11a are sequentially stacked on the second pattern unit 11b. In such an embodiment, the second pattern unit 11b having a largest area is disposed on a lower portion, and the pattern units having gradually reduced sizes are sequentially disposed on the second pattern units 11b. Widths of the first through third connecting portions 21a through 21c may be adjusted according to the stacking order of the pattern units 11a through 11d. The first connecting portion 21a between the first pattern unit 11a and the second pattern unit 11b may have greater width than widths of other connecting portions, e.g., the second and third connecting portions 21b and 21c.

Figure 3B:
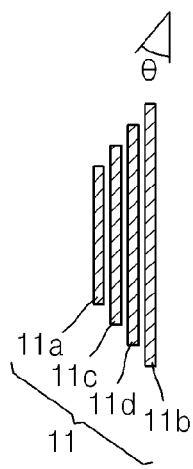
FIG. 3B is a cross-sectional view taken along line m1-m2 of the three-dimensional shaped battery of FIG. 1.

FIG. 3B is a cross-sectional view taken along line m1-m2 of the three-dimensional shaped battery of FIG. 1. Referring to FIG. 3B, the fourth pattern unit 11d, the third pattern unit 11c and the first pattern unit 11a are sequentially stacked on the second pattern unit 11b having the largest area. In such an embodiment, the pattern units 11 include at least two or more pattern units having different sizes from each other, and an inclination angle θ may be formed by end portions of the pattern units 11. The inclination angle θ formed by the end portions of the pattern units 11 is less than about 90°, and the inclination angle θ may be determined based on a shape of a space to be occupied by the battery, in the portable electronic device.

Figure 3C:
FIG. 3C is a cross-sectional view taken along line n1-n2 of the three-dimensional shaped battery of FIG. 2A.

FIG. 3C is a cross-sectional view taken along line n1-n2 of the cell structure of FIG. 2A. The cell structure 300 including the pattern units 11 and the connecting portions 21 may include a first electrode layer 301, a separation layer 302 and a second electrode layer 303. The first electrode layer 301 may be one of a positive plate or a negative plate. In an embodiment, the first electrode layer 301 is a positive plate, and the second electrode 303 is a negative plate. In an alternative embodiment, the first electrode layer 301 is a negative plate, and the second electrode layer 303 may be a positive plate. The positive plate and the negative plate may be provided by coating an electrode active material layer, for example, a positive active material layer or a negative active material layer, on an electrode current collector such as a positive current collector or a negative current collector. The positive plate and the negative plate may have substantially the same size as each other; however the invention is not limited thereto. In an alternative embodiment, the positive plate and the negative plate may have different sizes from each other based on bending or folding of the connecting portions. In an embodiment, the cell structure 300 is a jelly roll type, and an additional separation layer may be further disposed on a surface, e.g., an outer surface, of the first electrode layer 301 or the second electrode layer 303.

The positive plate may include the positive current collector and the positive active material layer disposed on surfaces of the positive current collector. The positive current collector may include metal such as aluminum, stainless steel, titan, copper, silver, or a combination thereof. The positive active material layer may include a positive active material, a binder and a conductive material.

In an embodiment, the positive active material may be any kind of material that may occlude or discharge lithium ions reversibly. In one embodiment, for example, the positive active material may include at least one selected from lithium transition metal oxides such as lithium cobalt oxide, lithium nickel oxide, lithium nickel cobalt oxide, lithium nickel cobalt aluminum oxide, lithium nickel cobalt manganese oxide, lithium manganese oxide and lithium iron phosphate, nickel sulfide, copper sulfide, sulfate, iron oxide and vanadium oxide.

In an embodiment, the binder of the positive active material layer may include at least one selected from vinylidene fluoride/hexafluoropropylene copolymer, poly(vinylidene fluoride), polyacrylonitrile, polymethylmethacrylate, polytetrafluoroethylene and styrene butadiene rubber-based polymer.

In an embodiment, the conductive material of the positive active material layer may include at least one selected from a carbon-based conductive material such as carbon black, carbon fiber and graphite, conductive fiber such as metal fiber, metal powder such as carbon fluoride powder, aluminum powder and nickel powder, a conductive whisker such as zinc oxide and potassium titanate, a conductive metal oxide such as titanium oxide, and polyphenylene derivatives.

The negative plate may include a negative current collector and a negative active material layer disposed on surface of the negative current collector. In an embodiment, the negative current collector may include at least one metal selected from copper, stainless steel, nickel, aluminum and titanium. The negative active material layer may include a negative active material, a binder and a conductive material.

In an embodiment, the negative active material may be any kind of material that may become alloy with lithium, or reversibly occlude or discharge lithium. In one embodiment, for example, the negative active material may be one selected from metal, carbon-based materials, metal oxides and lithium metal nitrides. The metal of the negative active material layer may include at least one material selected from lithium, silicate, magnesium, aluminum, germanium, tin, lead, arsenic, antimony, bismuth, silver, gold, zinc, cadmium, mercury, copper, iron, nickel, cobalt and indium. The carbon-based material may be at least one selected from graphite, graphite carbon fiber, cokes, mesocarbon microbeads ("MCMB"), polyacene, pitch-based carbon fiber and hard carbon. The metal oxide may include at least one selected from lithium titanium oxide, titanium oxide, molybdenum oxide, niobium oxide, iron oxide, tungsten oxide, tin oxide, amorphous tin mixed oxide, silicon monoxide, cobalt oxide and nickel oxide. The binder and the conductive material of the negative active material layer may be substantially the same as the binder and the conductive material of the positive active material layer.

In an embodiment, the separation layer 302 may be a porous polymer layer such as a polyethylene film or a polypropylene film, and may be formed as a woven or non-woven fabric. In such an embodiment, the separation layer 302 may include ceramic particles, and may be formed of a polymer solid electrolyte. The separation layer 302 may be provided by providing a non-conductive porous layer on the first electrode layer 301 or the second electrode layer 303. The separation layer 302 is provided by electrically separating the first and second electrode layers 301 and 303 from each other. In an embodiment, a shape of the separation layer 302 may be different from the shape of the first electrode layer 301 or the second electrode layer 303.

In an embodiment, the positive plate or the negative plate may be provided by applying the electrode active material layer on the electrode current collector in various ways, and the method of applying the electrode active material layer is not limited. In an embodiment, the electrode active material layer may be provided by being coated on the electrode current collector using a printing process. After coating the electrode active material layer on an entire surface of the electrode current collector, the electrode current collector may be cut to have a predetermined shape. In such an embodiment, the active material layer is provided only on a predetermined region to reduce an amount of un-used electrode active material, thereby improving the efficiency of the active material and reducing fabrication costs.

Figure 4A:
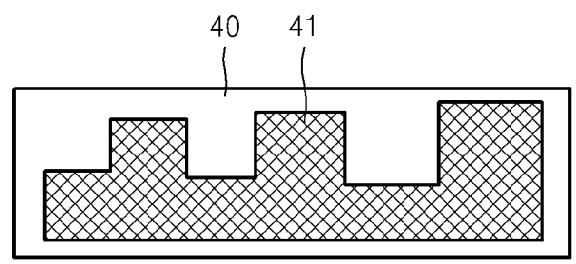
FIGS. 4A and 4B are diagrams showing an embodiment of a manufacturing process of forming an electrode active material layer on an electrode current collector using a printing process and then separating the electrode current collector on which the electrode active material layer has been formed.
Figure 4B:
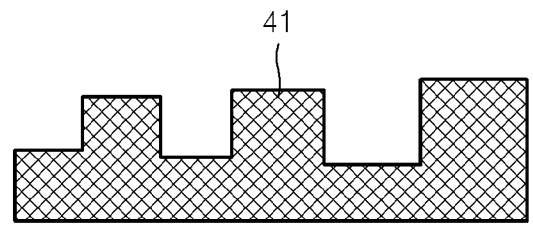

FIGS. 4A and 4B are diagrams showing an embodiment of a process of forming an electrode active material layer 41 on an electrode current collector 40 using the printing process and then separating the electrode current collector 40 on which the electrode active material layer 41 has been formed.

Referring to FIG. 4A, in an embodiment, the electrode active material layer 41 is applied on the electrode current collector 40 to have a predetermined shape. In such an embodiment, as shown in FIG. 4B, a region of the electrode current collector 40, on which the electrode active material layer 41 is not formed, is removed to fabricate the positive plate or the negative plate.

In an embodiment, the electrode active material layer may be formed only on a region corresponding to a shape of the pattern unit, and formation of the electrode active material layer may be omitted on the region corresponding to the connecting portion.

Figure 5A:
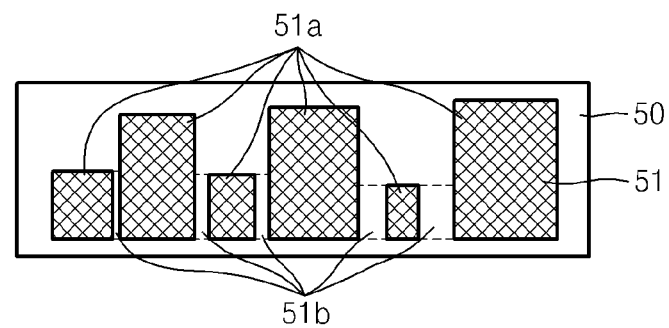
FIGS. 5A and 5B are diagrams showing an embodiment of a manufacturing process of forming an electrode active material layer on a part of an electrode current collector using a printing process and then separating the electrode current collector on which the electrode active material layer has been formed.
Figure 5B:
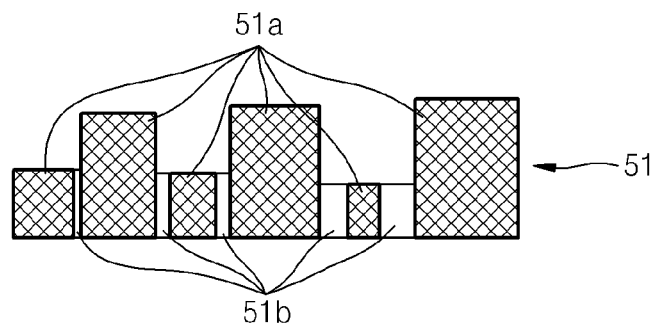

FIGS. 5A and 5B are diagrams showing an embodiment of a manufacturing process of forming an electrode active material layer on a part of an electrode current collector using a printing process and then separating the electrode current collector on which the electrode active material layer has been formed Referring to FIG. 5A, an electrode active material layer 51 is formed only on a region corresponding to a pattern unit 51*a* on an electrode current collector 50. The electrode active layer 51 is not provided on a region corresponding to a connecting portion 51*b*. In an embodiment, regions of the electrode current collector 50, except for the pattern unit 51*a* and the connecting portion 51*b*, are removed to fabricate the positive plate or the negative plate as shown in FIG. 5B. The electrode active material layer 51 may be applied on a region equal to or greater than about 90% of the pattern unit 51*a*.

As described above, the electrode active material layer 41 or 51 on the electrode current collector 40 or 50 may be applied by various processes. In an embodiment, the printing process is used for applying the electrode active material layer 41 or 51 on the predetermined regions of the electrode current collector 40 or 50. In one embodiment, for example, the printing process may be performed using a screen printing method, a stenciling method, a gravure printing, an inkjet printing, a flexography method and a lithography method.

In an embodiment, the positive plate and the negative plate may be connected to lead taps to be electrically connected to external terminals. In such an embodiment, the electrode active material layer 41 or 51 is exposes a portion of the electrode current collector 40 or 50 of the positive plate or the negative plate to form an exposed portion of the electrode current collector 40 or 50, and the exposed portion of the electrode current collector 40 or 50 may be electrically connected to the lead tap. In an embodiment of the three-dimensional shaped battery, the cell structure may be packed by a flexible pouch, and in such an embodiment, the lead tap may be exposed by the pouch of the battery to form a terminal of the battery. In an embodiment, the lead taps of the positive plate and the negative plate may be disposed in a same direction as each other. In an alternative embodiment, the lead taps of the positive plate and the negative plate may be disposed in different directions from each other.

In an embodiment, a portion of the electrode current collector 40 or 50 of the positive plate or the negative plate may be elongated and electrically connected to the lead tap that is connected to the outside of the battery. In an embodiment, the extending portions of the positive plate and the negative plate may be disposed in a same direction as each other. In an alternative embodiment, the extending portions of the positive plate and the negative plate may be disposed in different directions from each other.

The positive plate and the negative plate described above are respectively used as the first electrode layer 301 or the second electrode layer 303, which disposed overlapping each other, thereby providing the cell structure 300.

Figure 6A:
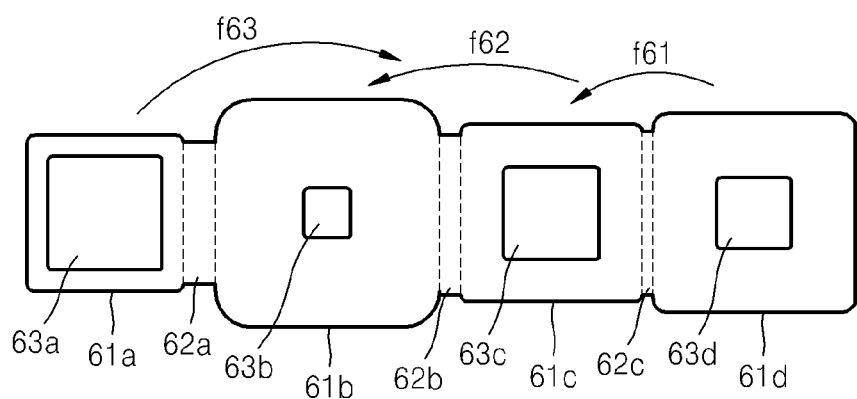
FIGS. 6A and 6B are diagrams of another embodiment of a three-dimensional shaped battery in which a hole is formed in a pattern unit according to the invention.
Figure 6B:
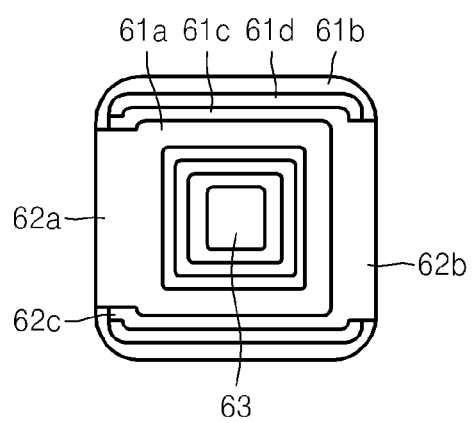

FIGS. 6A and 6B are diagrams of another embodiment of a three-dimensional shaped battery, in which holes are formed in pattern units, according to the invention.

Referring to FIG. 6A, the cell structure includes a plurality of pattern units, e.g., a first pattern unit 61*a*, a second pattern unit 61*b*, a third pattern unit 61*c* and a fourth pattern unit 61*d*, having different sizes from each other, a plurality of connecting portions, e.g., a first connecting portion 62*a*, a second connecting portion 62*b* and a third connecting portion 62*c*, are disposed between the pattern units 61*a*, 61*b*, 61*c* and 61*d*. The pattern units 61*a*, 61*b*, 61*c* and 61*d* respectively include a plurality of holes, e.g., a first hole 63*a*, a second hole 63*b*, a third hole 63*c* and a fourth hole 63*d*, formed therethrough.

In an embodiment of the three-dimensional shaped battery, as shown in FIGS. 6A and 6B, the third connecting portions 62*c* is bent or folded (f61) such that the fourth pattern unit 61*d* is disposed on the third pattern unit 61*c*, and the second connecting portion 62*b* is bent or folded (f62) such that the fourth pattern unit 61*d* and the third pattern unit 61*c* are disposed on the second pattern unit 61*b*. The first connecting portion 62*a* is bent or folded such that the first pattern unit 61*a* is disposed on the third pattern unit 61*c*. In such an embodiment, the first through fourth pattern units 61*a* through 61*d* face each other, and the holes 63*a* through 63*d* penetrating through the first through fourth pattern units 61*a* through 61*d* respectively are defined and aligned to form a continuous hole 63. The three-dimensional shaped battery having the above structure may be disposed, e.g., inserted, into a predetermined space in an electronic device, thereby substantially improving efficiency of a space usage.

Figure 7A:
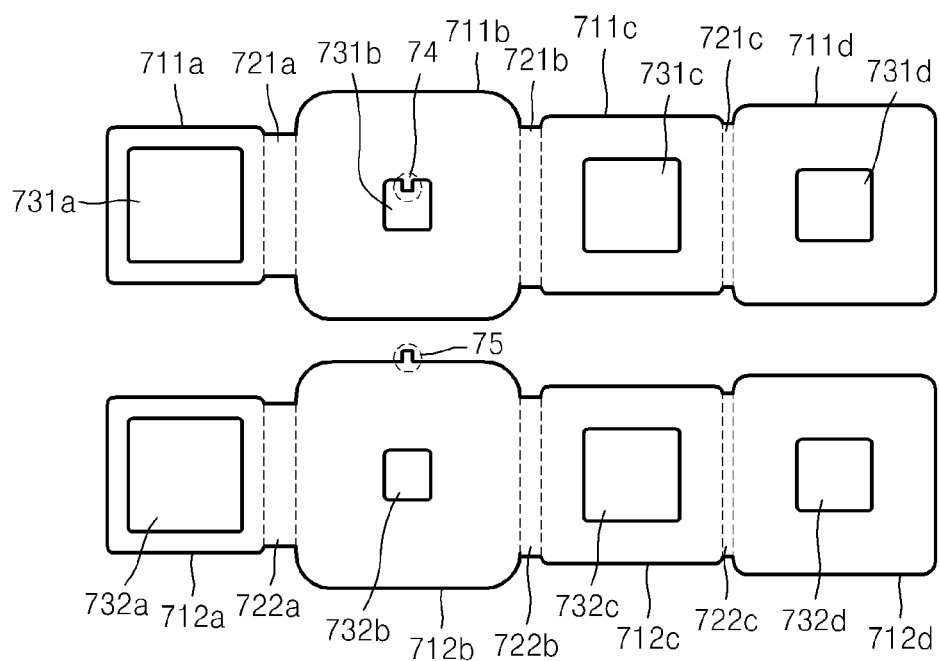
FIG. 7A is a diagram showing an unfolded state of a first electrode layer and a second electrode layer on which lead tap terminals are respectively disposed.

FIG. 7A is a diagram showing an unfolded states of the first and second electrode layers on which the lead tap terminals are respectively disposed. In addition, FIG. 7B is a diagram showing the three-dimensional shaped battery in which the first and second electrode plates are folded.

Referring to FIG. 7A, the first electrode layer includes a plurality of pattern units 711*a*, 711*b*, 711*c* and 711*d*, and a plurality of connecting portions 721*a*, 721*b* and 721*c* disposed between the pattern units 711*a* through 711*d*. Holes 731*a*, 731*b*, 731*c* and 731*d* that penetrate through the pattern units 711*a* through 711*d* are respectively formed in the pattern units 711*a* through 711*d*. A first lead tap 74 that is electrically connected to an external terminal is provided in the hole 731*b* of the second pattern unit 711*b*.

The second electrode layer includes a plurality of pattern units 712*a*, 712*b*, 712*c* and 712*d* having different sizes from each other, and a plurality of connecting portions 722*a*, 722*b* and 722*c* disposed between the pattern units 712*a* through 712*d*. The pattern units 712*a* through 712*d* of the second electrode layer respectively include holes 732*a*, 732*b*, 732*c* and 732*d* that penetrate therethrough. A second lead tap 75 that is electrically connected to an external terminal is disposed on a side portion of the second pattern unit 712*b*.

Figure 7B:
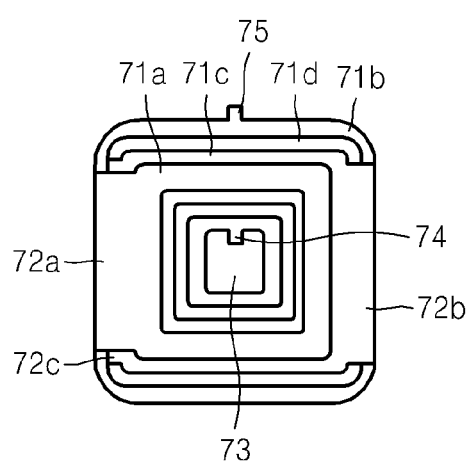
FIG. 7B is a diagram showing a three-dimensional shaped battery in which the first and second electrode layers shown in FIG. 7A are folded.

FIG. 7B shows a structure of the three-dimensional battery formed using the first and second electrode layers shown in FIG. 7A.

Referring to FIG. 7B, the cell structure has a structure in which a plurality of pattern units, e.g., first through fourth pattern units 71*a* through 71*d*, are sequentially stacked, and a plurality of connecting portions 72*a* through 72*c* disposed between the pattern units 71*a* through 71*d* are bent or folded to stack the pattern units 71*a* through 71*d*. The pattern units 71*a* through 71*d* of the cell structure include the pattern units 711*a* through 711*d* of the first electrode layer and the pattern units 712*a* through 712*d* of the second electrode layer, and the connecting portions 72*a* through 72*c* of the cell structure includes the connecting portions 721*a*, 721*b* and 721*c* of the first electrode layer and the connecting portions 722*a*, 722*b* and 722*c* of the second electrode layer. The holes 731*a*, 731*b*, 731*c*, 731*d*, 732*a*, 732*b*, 732*c* and 732*d* respectively penetrate through the pattern units 71*a* through 71*d* and are aligned to form a continuous hole 73. The first lead tap 74 that is electrically connected to the external terminal is disposed on the first electrode layer and the second lead tap 75 that is electrically connected to the external terminal is disposed in and overlapping the hole 732*b* of the second electrode layer. As described above, the lead taps 74 and 75 on the first and the second electrode layers respectively may extend in different directions from each other, e.g., opposing directions. In an alternative embodiment, the lead taps on the first and the second electrode layers may extend in the same direction as each other.

In an embodiment, the three-dimensional shaped battery includes the cell structure having the pattern units and the connecting portions as described above, and the shape and area of each of the pattern units may be adjusted based on the shape of a battery insertion unit in an electronic device. Hereinafter, an embodiment of a method of designing the pattern units and the connecting portions, e.g., a method of determining the shapes and areas of the pattern units and the connecting portions, will be described.

In an embodiment, where the pattern units include a first pattern unit through an m-th pattern unit, and an (m+1)-th pattern unit through an n-th pattern unit (m and n are natural numbers), areas of the first pattern unit through the m-th pattern unit and the (m+1)-th pattern unit through the n-th pattern unit may be respectively denoted as $A_1$ through $A_m$, and $A_{m+1}$ through $A_n$. Here, m is less than n/2 and a natural number closest to n/2, and when the pattern unit having the greatest area is disposed between the first through m-th pattern units, the areas of the pattern units may be set to satisfy the following inequation 1 in the three-dimensional shaped battery.

$$\frac{\sum_{i=1}^{m}\left(A_i - \frac{\sum_{k=1}^{m} A_k}{m}\right)^2}{m} > \frac{\sum_{j=m+1}^{n}\left(A_j - \frac{\sum_{l=m+1}^{n} A_l}{n-m}\right)^2}{n-m} \quad (1)$$

Figure 8:
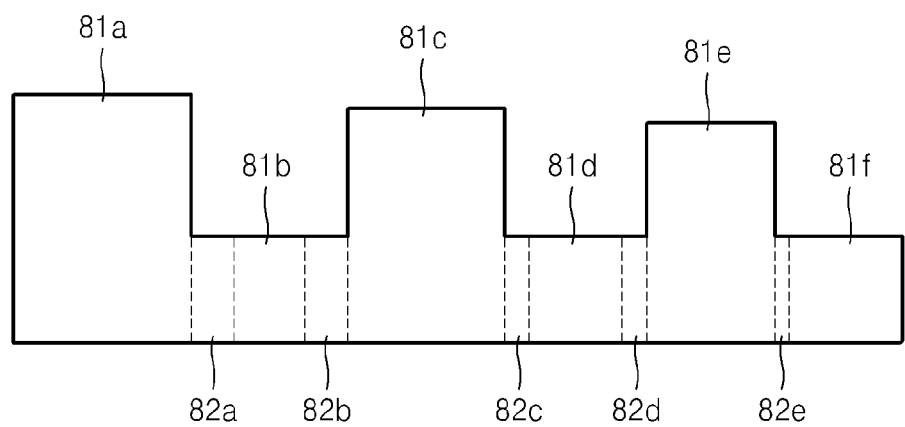
FIG. 8 is a diagram showing an embodiment of a cell structure formed by applying Inequation 1.

FIG. 8 shows an embodiment of a cell structure based on areas of the pattern units determined according to inequation 1. Referring to FIG. 8, six pattern units, e.g., first through sixth pattern units 81*a*, 81*b*, 81*c*, 81*d*, 81*e* and 81*f*, are provided, and five connecting portions, e.g., first through fifth connecting portions 82*a*, 82*b*, 82*c*, 82*d* and 82*e*, are disposed between the pattern units 81*a* through 81*f*. In such an embodiment, n is 6 and m is 3 in the above inequation 1, and the first pattern unit 81*a* may have the greatest area among the pattern units. In one embodiment, for example, the first through sixth pattern units 81*a* through 81*f* may have areas of about 12 square centimeters ($cm^2$), about 1.6 $cm^2$, about 9.88 $cm^2$, about 2.52 $cm^2$, about 7.92 $cm^2$ and about 3.6 $cm^2$, respectively, which satisfy above inequation 1.

As described above, when the three-dimensional shaped battery is formed using above inequation 1, the pattern units having less areas are sequentially disposed on the pattern unit of the greatest area, and side end portions of the pattern units are disposed to be inclined, thereby providing the three-dimensional shaped battery.

In such an embodiment, an intermediate portion in the stacked structure of the pattern units, e.g., the stacked pattern units, in the three-dimensional shaped battery may have the largest width or the narrowest width, areas of the pattern units may be set to satisfy following inequation 2. Here, the pattern units include a first pattern unit through an m-th pattern unit, and an (m+1)-th pattern unit through an n-th pattern unit (m and n are natural numbers), and areas of the first through m-th pattern units, and the (m+1)-th pattern unit through n-th pattern unit are respectively $A_1$ through $A_m$, and $A_{m+1}$ through $A_n$. Here, m is an integer that is less than and the closest to n/2, and the pattern unit having the greatest area is disposed between the first pattern unit and the m-th pattern unit.

$$\frac{\sum_{i=1}^{m} A_i}{m} > \frac{\sum_{j=m+1}^{n} A_j}{n-m} \quad (2)$$

In an embodiment, when the cell structure including the pattern units is designed to satisfy above inequation 2, the three-dimensional shaped battery in which the intermediate portion of the stacked structure of the pattern unit has less widths than widths of upper and lower portions of the stacked structure may be provided by winding the first pattern unit to be located at an outer portion of the n-th pattern unit. In such an embodiment, the three-dimensional shaped battery in which the intermediate portion of the stacked structure of the pattern units has greater width than widths of the upper and lower portions thereof may be provided by winding the first pattern unit to be located at an inner portion of the n-th pattern unit.

Figure 9A:
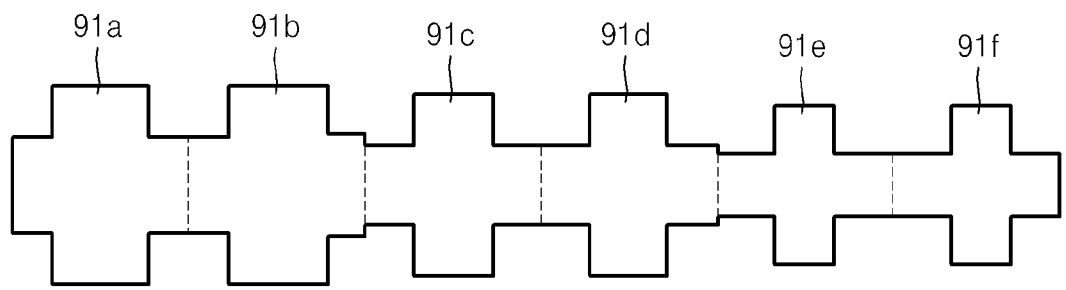
FIG. 9A is a diagram showing an embodiment of a cell structure formed by applying Inequation 2.

FIG. 9A shows a cell structure provided using above inequation 2. Referring to FIG. 9A, six pattern units, e.g., first through sixth pattern units 91*a*, 91*b*, 91*c*, 91*d*, 91*e* and 91*f*, are provided, and a plurality of connecting portions may be provided between the first through sixth pattern units 91*a* through 91*f*. Since widths of the connecting portions may vary depending on a stacking order of the first through sixth pattern units 91*a* through 91*f*, the connecting portions are not shown in FIG. 9A. According to above inequation 2, n is 6 and m is 3, and the first pattern unit 91*a* has the largest area among the pattern units 91*a* through 91*f*.

Figure 9B:
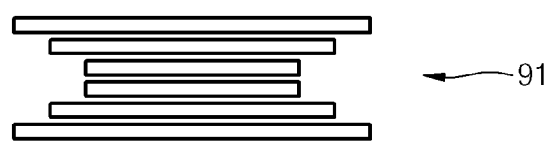
FIG. 9B is a diagram showing an embodiment of a three-dimensional shaped battery in which an intermediate portion in a stacked structure of a pattern unit has relatively narrower width than a width of the other portion.
Figure 9C:
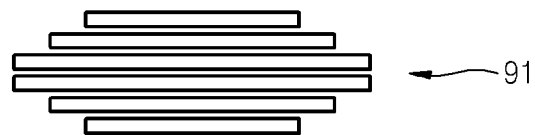
FIG. 9C is a diagram showing an embodiment of a three-dimensional shaped battery in which an intermediate portion in the stacked structure of the pattern unit has the widest width.

In an embodiment, when the cell structure is wound such that the first pattern unit 91*a* is wound at an outer portion of the sixth pattern unit 91*f*, as shown in FIG. 9B, in the three-dimensional shaped battery, an intermediate portion of the stacked structure of the pattern units 91*a* through 91*f* may have a width less than widths of the other portions. In such an embodiment, when the cell structure is formed by winding the pattern units such that the first pattern unit 91*a* is wound on an inner portion of the sixth pattern unit 91*f*, as shown in the three-dimensional shaped battery of FIG. 9C, the intermediate portion of the stacked structure of the pattern units 91*a* through 91*f* has the largest width.

In an embodiment, when the connecting portions include a first connecting portion through an h-th connecting portion (h is natural number), and when widths of the first through h-th connecting portions are respectively denoted as W1 through Wh, the first connecting portion is located between the first and second pattern units. In an embodiment, when h is greater than 7, W1 through Wh may satisfy the following inequation 3.

$$W_i + W_{i+1} + W_{i+2} + W_{i+3} > W_{i+4} + W_{i+5} + W_{i+6} + W_{i+7} \quad (3)$$

In inequation 3, i is an integer equal to or greater than 1 and equal to or less than h−7.

When the connecting portions are provided using inequation 3, the widths of the connecting portions may be wide when the pattern units are stacked, thereby effectively providing the pattern units in multiple layers.

In an embodiment, as described above, the three-dimensional shaped battery may have the structure formed by winding the cell structure including the pattern units and the connecting portions in a direction. In an alternative embodiment, the cell structure may be provided to have a folding structure in which the connecting portions are folded in zigzag manner. In such an embodiment, the pattern units may include a first pattern unit through an m-th pattern unit, and an (m+1)-th pattern unit and an n-th pattern unit (m and n are natural numbers), and the pattern units may have areas of $A_1$ through $A_m$, and $A_{m+1}$ through $A_n$. Here, m is an integer that is less than m/2 and closest to n/2, and when the pattern unit having the largest area is disposed between the first pattern unit through the m-th pattern unit, $A_1$ through $A_m$ and $A_{m+1}$ through $A_n$ may satisfy following inequation 4 in the three-dimensional shaped battery.

$$\sum_{k=0}^{3} A_{i+k} > \sum_{j=4}^{7} A_{i+j} \quad (4)$$

In inequation 4, i is an integer equal to or greater than 1 and equal to or less than n−7.

As described above, an embodiment of the three-dimensional shaped battery according to the invention includes the pattern units having different sizes from each other, and the connecting portions disposed between the pattern units, and the cell structure is formed by bending or folding the connecting portions to stack the pattern units facing each other.

According to one or more embodiments of the invention, the cell structure is provided to have a shape corresponding to the inner space in the electronic device and the three-dimensional shaped battery including the cell structure may be provided. Accordingly, when the inner space of the electronic device has an inclined surface, the battery having a corresponding shape may be provided.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A three-dimensional shaped battery comprising:
    a cell structure comprising:
        at least two pattern units having different sizes from each other;
        a connecting portion which connects the pattern units to each other, and
        each of the at least two pattern units and the connecting portion are defined having a separation layer disposed between a first electrode layer and a second electrode layer.

2. The three-dimensional shaped battery of claim 1, wherein the connecting portion is bent or folded such that the pattern units are stacked to face each other.

3. The three-dimensional shaped battery of claim 2, wherein areas of the pattern units are gradually changed in a direction in which the pattern units are stacked.

4. The three-dimensional shaped battery of claim 2, wherein an intermediate portion in the stacked pattern units has an area greater than areas of other portions in the stacked pattern units.

5. The three-dimensional shaped battery of claim 2, wherein an intermediate portion in the stacked pattern units has an area less than areas of other portions in the stacked pattern units.

6. The three-dimensional shaped battery of claim 2, wherein a hole is defined in the pattern units.

7. The three-dimensional shaped battery of claim 6, wherein the hole is defined in each of the pattern units at a portion corresponding to each other in the stacked pattern units.

8. The three-dimensional shaped battery of claim 1, wherein an inclination surface is defined by end portions of the pattern units in the cell structure.

9. The three-dimensional shaped battery of claim 1, wherein the cell structure further comprises a plurality of connecting portions having different sizes from each other.

10. The three-dimensional shaped battery of claim 2, wherein the cell structure has a jelly roll type structure or a folding type structure.

11. The three-dimensional shaped battery of claim 1, wherein the cell structure further comprises an active material layer which does not overlap the connecting portion.

12. The three-dimensional shaped battery of claim 1, further comprising:
    an electrode current collector extending from the first electrode layer or the second electrode layer; and
    a lead tap electrically connected to the electrode current collector.

13. The three-dimensional shaped battery of claim 12, wherein
    the electrode current collector extends from the first electrode layer,
    the electrode current collector extends from the second electrode layer, and
    the electrode current collector of the first electrode layer and the electrode current collector of the second current collector extend in different directions from each other.

14. The three-dimensional shaped battery of claim 12, wherein
    the cell structure further comprises an active material layer which does not overlap the connecting portion, and
    the lead tap is electrically connected to a region of the first electrode layer or the second electrode layer, which does not overlap the active material layer.

15. The three-dimensional shaped battery of claim 1, further comprising:
    a pouch, in which the pattern units are packed.

16. The three-dimensional shaped battery of claim 1, wherein the pattern units comprise a first pattern unit through an m-th pattern unit and an (m+1)-th pattern unit through an n-th pattern unit, wherein m and n are natural numbers, and when areas of the first pattern unit through the m-th pattern unit and the (m+1)-th pattern unit through the n-th pattern unit are respectively denoted as $A_1$ through $A_m$, and $A_{m+1}$ through $A_n$, and when m is an integer that is less than n/2 and closest to n/2 and the pattern unit having the largest area is disposed between the first pattern unit through the m-th pattern unit, $A_1$ through $A_m$ and $A_{m+1}$ through $A_n$ satisfy the following inequation:

$$\frac{\sum_{i=1}^{m}\left(A_i - \frac{\sum_{k=1}^{m} A_k}{m}\right)^2}{m} > \frac{\sum_{j=m+1}^{n}\left(A_j - \frac{\sum_{l=m+1}^{n} A_l}{n-m}\right)^2}{n-m}.$$

17. The three-dimensional shaped battery of claim 16, wherein the connecting portion comprises a first connecting portion through an h-th connecting portion, wherein h is a natural number, and when widths of the connecting portions are respectively denoted as W1 through Wh, and the first connecting portion is connected to the first pattern unit, and when h is greater than 7, W1 through Wh satisfy the following inequation:

$W_i + W_{i+1} + W_{i+2} + W_{i+3} > W_{i+4} + W_{i+5} + W_{i+5} + W_{i+7}$, wherein i is an integer equal to or greater than 1 and equal to or less than h−7.

18. The three-dimensional shaped battery of claim 1, wherein the pattern units comprise a first pattern unit through an m-th pattern unit, and an (m+1)-th pattern unit through an n-th pattern unit, wherein m and n are natural numbers, and when areas of the pattern units are respectively denoted as $A_1$ through $A_m$, and $A_{m+1}$ through $A_n$, wherein when m is an integer that is less than n/2 and closest to n/2, and the pattern unit having the largest area is disposed between the first pattern unit through the m-th pattern unit, $A_1$ through $A_m$ and $A_{m+1}$ through $A_n$ satisfy the following inequation:

$$\frac{\sum_{i=1}^{m} A_i}{m} > \frac{\sum_{j=m+1}^{n} A_j}{n-m}.$$

19. The three-dimensional shaped battery of claim 1, wherein the pattern units comprises a first pattern unit through an m-th pattern unit, and an (m+1)-th pattern unit through an n-th pattern unit, wherein m and n are natural numbers, and when areas of the pattern units are respectively denoted as $A_1$ through $A_m$, and $A_{m+1}$ through $A_n$, wherein when m is an integer that is less than n/2 and closest to n/2, and the pattern unit having the largest area is disposed between the first pattern unit through the m-th pattern unit, $A_1$ through $A_m$ and $A_{m+1}$ through $A_n$ satisfy the following inequation:

$$\sum_{k=0}^{3} A_{i+k} > \sum_{j=4}^{7} A_{i+j},$$

wherein i is an integer equal to or greater than 1 and equal to or less than n−7.

20. A method of manufacturing a three-dimensional shaped battery, the method comprising:

providing a first electrode layer and a second electrode layer of a cell structure of the three-dimensional shaped battery by coating an electrode active material layer on an electrode current collector using a printing method, wherein the cell structure of the three-dimensional shaped battery comprises:

at least two pattern units having different sizes from each other;

a connecting portion which connects the pattern units to each other, and each of the at least two pattern units and the connecting portion are defined having a separation layer disposed between the first electrode layer and the second electrode layer.

* * * * *